Nov. 13, 1956 W. E. BURKART 2,770,710
ARC WORKING APPARATUS
Filed May 26, 1954
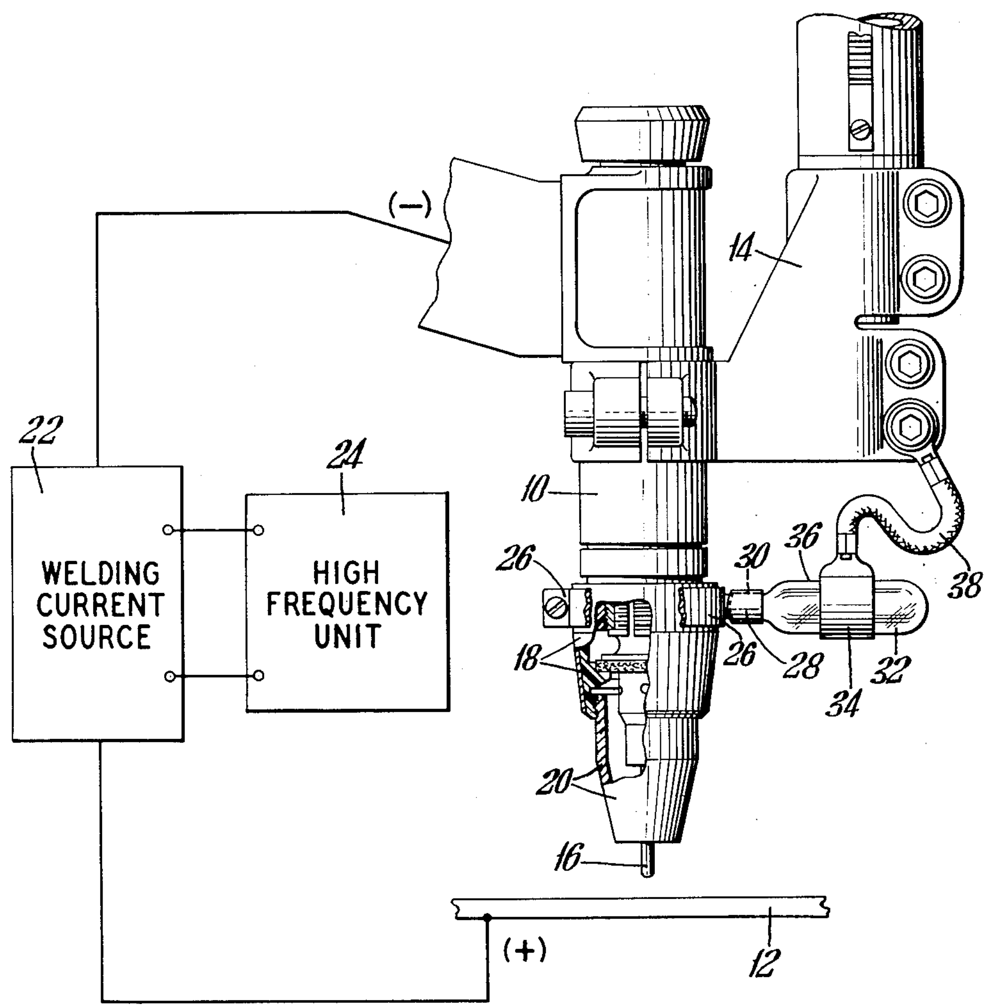
INVENTOR
WALTER E. BURKART
BY
Barnwell R. King
ATTORNEY United States Patent Office 2,770,710

Patented Nov. 13, 1956

2,770,710

ARC WORKING APPARATUS

Walter E. Burkart, St. Louis, Mo., assignor to Union Carbide and Carbon Corporation, a corporation of New York Application May 26, 1954, Serial No. 432,536

4 Claims. (Cl. 219—130)

This invention relates to arc working and more particularly to gas-shielded arc welding and cutting apparatus employing high-frequency for starting the arc.

The invention involves introducing suitable means such as a gas-discharge tube (G. E. No. NE 45, ¼-watt) between the torch body and nozzle. In operation it is believed that the neon tube assures arc starting by acting to remove or reduce a voltage charge that accumulates in the water jacket-cup assembly, which voltage charge tends to block the desired "firing" of the torch.

The single figure of the drawing is a view mainly in side elevation of arc working apparatus illustrating the invention.

As shown in such drawing, the body of an arc welding torch 10 is supported above work 12 by a metal bracket 14 which is grounded by the apparatus. The torch includes a refractory metal (tungsten) electrode 16 which is surrounded by and electrically insulated from a water-cooled nozzle 18 comprising a gas cup 20 of metal such as copper that is insulated from the body of the torch. The electrode 16 and work 12 are connected in circuit with a suitable source of welding current 22 and a high-frequency supply unit 24 in the usual way. The torch is supplied with a suitable arc shielding gas such as argon which is discharged in an annular stream from the cup 20 about the end of electrode 16. In the case of a welding current source of D. C. supplied with high-frequency potential for firing or starting the arc between the end of the electrode 16 and the work 12, failure of the desired firing action presents a serious problem.

Such problem is solved according to this invention by mounting a clamp 26 on the nozzle 18 which clamp is provided with a socket 28. The base 30 of a gas filled lamp 32 is connected in such socket so that at least one of the terminals of such lamp is electrically connected to the nozzle by directly contacting the latter. A metal clip 34 is mounted on the glass envelope 36 of the lamp and is connected, i. e., grounded, by a flexible conductor 38 to the bracket 14. This improvement not only acts to overcome arc starting failure but increases the arc length jumping ability of the system by 100 percent.

The inert gas-shielded non-consumable electrode welding process of Meredith Patent No. 2,342,086, for example, requires either direct current or alternating current welding power. A welding generator or rectifier may be used for supplying direct current power; and a welding transformer for alternating current power. Additionally in all cases with alternating current, and sometimes with direct current, a high-frequency potential is superimposed on the welding current for the following reasons:

When welding with direct current-reverse polarity, i. e., electrode positive, electrons strike the electrode and heat it. The positive gas ions strike the work. Electrons and positively charged gas ions are the principal constituents of the welding arc. In direct current-straight polarity welding, the negatively charged electrons travel toward the (positive) work at relatively high velocity, whereas the positively charged gas ions travel toward the negative electrode at relatively low velocity.

A desirable cleaning action is obtained with direct current-reverse polarity. Although the explanation of such good cleaning action is not obvious, one theory is that the electrons leaving the work serve to break up surface oxides. Another theory is that the positive ions bombard the work, thereby disrupting the surface oxide layer. However, direct current-straight polarity is preferred over alternating current for welding power where the electrode itself is not consumed, i. e., is composed of refractory material. Direct current-straight polarity gives greater penetration and more stable arc characteristics. Also, a smaller electrode can be used for a given operation. Therefore, for welding the steels, coppers, and copper alloys, D. C. S. P. is preferred. Where the cleaning action obtained with reverse polarity is required, such as in welding aluminum and magnesium, alternating current welding power would be preferred.

In A. C. arc welding the alternating current wave starts at zero, increases to a maximum in the reverse polarity direction, decreases to zero, decreases further to a maximum negative value in the straight polarity direction, and then increases to zero. This cycle is completed in 1/60 sec. for example in the case of 60 cycle alternating current. With this type of current, the arc goes out each half-cycle and must be re-ignited. If rectification is present re-ignition is difficult and the arc becomes unstable.

By superimposing a relatively high-voltage, high-frequency, low-power current on the A. C. welding current, as disclosed by Miller Patent No. 2,475,357, the arc is re-ignited every half-cycle and thereby is stabilized. As a result, the reverse polarity flow and allied cleaning action are obtained with A. C. It is believed that the high-frequency current ionizes the gas in the arc and pierces the oxide film. This action aids current flow by eliminating rectification and permits welding with a constant, unbroken unbalanced wave.

In alternating current plus high-frequency welding, the electrode does not have to touch the workpiece to start the arc. The superimposed high-frequency current jumps the gap between the welding electrode and the work. An ionized path is, therefore, established for the welding current to follow. The procedure, for example, in manual welding is to bring the electrode to within approximately ⅛-inch of the workpiece. The arc will then strike, i. e., fire the electrode.

In direct current welding, somewhat the same procedure is used to strike the arc and fire the electrode, except that, generally speaking, the electrode must touch the work. The touch-the-work procedure can be done easily in manual welding; however, a mechanized or automatic setup presents a problem of arc starting because complicated mechanism has to be used to accomplish the touch and retract action. A logical conclusion, therefore, would be to superimpose a high-frequency current on the direct current-straight polarity welding current to initiate positive arc starts. This was done but in some cases starting difficulty persisted as described below.

In cases where high-frequency stabilizers or high-frequency generators were used with direct current-straight polarity to initiate the arc in mechanized automatic arc welding, difficulty was experienced in obtaining positive starts. Such arc-starting difficulty increased in intensity with successive welds as the operation progressed. That is, the condition seemed to be associated with a voltage build-up in the metal parts which surround the electrode but are insulated from it as well as from the torch body. These surrounding parts include the water jacket of the torch and the metal gas cup.

Arc starting was particularly troublesome in the case of multi-torch arc welding machines requiring dependable arc starting of one to four torches operating simultaneously. Up to eight starts per torch were often required to complete the welding of a stator pack, for example.

I discovered, however, that consistent starts always could be obtained by introducing a neon bulb 32 (General Electric, catalog number NE 45, ¼-watt) between the torch 10 and ground 14, as shown in the drawing. A possible explanation of this unexpected result is that the gas cup 20 and water jacket 18 of the torch are kept at ground potential by the neon bulb 32 and clip 34 acting as a potential discharge condenser. The high-frequency voltage and current vary over a very wide range. For example, the frequency range is about 30 kilocycles to over 3 megacycles. The high-frequency voltage is approximately 2500 to 8000 volts. On the other hand, the high-frequency current is very low—a few amperes at most. The welding voltage and current depend on the application. For example, the welding current range might be from 1.5 to 500 amperes. On occasion, the current might be considerably higher. Welding voltage range is from 8 to 150 volts, again depending on the application.

The torch 10 with its gas shield 20 is comparable to a vacuum tube or gas-filled thyratron tube. In the case of DC–SP, for example, the water jacket and cup of the torch, being insulated from the body of the torch, act as a grid between the cathode (electrode) and anode (workpiece) of such tube. The grid (cup and water jacket of the torch) accumulates a voltage charge in the same manner as a capacitor. When such voltage is of sufficient magnitude, it acts to block the high-frequency or welding current from passing from the electrode to the workpiece. The neon tube, however, acts to remove or reduce such blocking potential developed in the cup and water jacket.

Other means were substituted for the neon bulb, such as copper wire, resistors, and condensers. The disadvantage of these devices is that they result in damage to the torch by arcing. This difficulty has been known for years but the solution was not obvious.

I claim:

1. Arc working apparatus comprising the combination with a metal bracket, an electric arc working torch having a body mounted on said bracket, said torch comprising an electrode and a gas cup of metal surrounding and spaced from such electrode and insulated from said body of the torch, and sources of working current and high-frequency connected to said electrode, of a neon tube comprising a metal base provided with at least one terminal and a glass envelope, means electrically connecting said terminal to said gas cup, and means including a metal clip electrically connecting said glass envelope to said bracket, said neon tube and clip being effective as a potential discharge condenser to assure the starting of a working arc between such electrode and another electrode in circuit with said sources of working current and high-frequency.

2. Electric arc working apparatus comprising the combination of an electric torch comprising a body and a gas cup of metal and an electrode therein, and means electrically insulating such cup and electrode and body from one another, of a potential discharge condenser comprising a metal bracket supporting said torch body, a gas filled tube mounted on said cup, and a metal clip on said tube which is grounded to said bracket.

3. Arc welding apparatus comprising a torch supporting bracket, a water cooled torch comprising a body mounted on said bracket, said torch also comprising an electrode and a metal nozzle insulated from each other and from said body, a welding current circuit connected to said electrode, a source of high-frequency potential connected to said circuit for firing said electrode, and a potential discharge condenser for inhibiting the tendency of such nozzle from blocking the firing of said electrode, comprising a gas filled tube, a clamp on said nozzle supporting the base of said tube with a terminal thereof in contact with said nozzle, and a metal clip on the tube electrically connected to said bracket.

4. Arc welding apparatus as defined by claim 3, in which a source of direct current is connected to said circuit, the electrode is tungsten, and a suitable arc shielding gas is supplied to said nozzle for discharge about the end of such electrode.

References Cited in the file of this patent

UNITED STATES PATENTS

| | | |
|---|---|---|
| 1,162,419 | Van Deventer | Nov. 30, 1915 |
| 2,620,422 | Volff | Dec. 2, 1952 |

OTHER REFERENCES

Welding Handbook, 3d ed., pp. 263–267, 1950, Amer. Weld. Soc.